United States Patent [19]

Rogers et al.

[11] Patent Number: 5,075,919
[45] Date of Patent: Dec. 31, 1991

[54] TRANSDUCER HEAD CLEANING DISK

[75] Inventors: Randall J. Rogers, Millis; Beth Z. Silverman, Newton Center, both of Mass.

[73] Assignee: International Paper Company, Purchase, N.Y.

[21] Appl. No.: 923,376

[22] Filed: Oct. 27, 1986

[51] Int. Cl.⁵ .................... A47L 25/00; G11B 33/00
[52] U.S. Cl. ................... 15/210 R; 360/128
[58] Field of Search ................... 15/210 R; 360/128

[56] References Cited

U.S. PATENT DOCUMENTS

| | | | |
|---|---|---|---|
| 3,789,452 | 2/1974 | Nemoto | 15/210 R |
| 4,065,798 | 12/1977 | Sugisaki et al. | 15/210 R X |
| 4,180,840 | 12/1979 | Allan | 360/128 |
| 4,375,658 | 3/1983 | Martinelli | 360/128 |
| 4,377,831 | 3/1983 | Davis et al. | 360/128 |
| 4,408,241 | 10/1983 | Ogawa | 15/210 R X |
| 4,499,516 | 2/1985 | Purdy et al. | 360/128 |
| 4,503,473 | 3/1985 | Eyler et al. | 360/128 |
| 4,628,388 | 12/1986 | Kawabe | 360/128 |
| 4,639,813 | 1/1987 | Uno | 360/128 |

FOREIGN PATENT DOCUMENTS 2556919  6/1976  Fed. Rep. of Germany ...... 360/128

*Primary Examiner*—Harvey C. Hornsby
*Assistant Examiner*—Scott J. Haugland
*Attorney, Agent, or Firm*—Walt Thomas Zielinski

[57] ABSTRACT

A head cleaning disk for cleaning magnetic transducer heads in flexible computer disk drives. The head cleaning disk comprises a top fibrous wiping layer having a blend of low melt point and high melt point fibers, an inner composite layer of a multi-layer thermoplastic opaque film having two outside reflective layers of low melt point polymer and two inner layers of metal and film, and a bottom fibrous wiping layer having a blend of low melt point and high melt point fibers. The top, inner and bottom layers are bonded together by passing them between a pair of heated rolls which are under pressure. The heat from the rolls melts the low melt point fibers in the top and bottom fibrous layers and the outside reflective thermoplastic polymer of the inner layer thusly securing the layers together. The top and bottom fibrous layers provide sufficient abrasivity so when they contact the transducer heads they will remove debris from them without the use of cleaning solutions. In addition, the abrasivity of the top and bottom fibrous layers is controlled so there is insufficient abrasivity to damage the transducer heads. The inner opaque film layer permits activation of the optical system of the computer disk drive system thus permitting the transducer heads to be loaded onto the disk. The opaque layer also provides sufficient stiffness so that the cleaning disk can be rotated in its jacket without difficulty or malfunction.

3 Claims, 2 Drawing Sheets

TRANSDUCER HEAD CLEANING DISK

BACKGROUND OF THE INVENTION

1. Field of Invention

The invention relates to cleaning media for cleaning recording mediums, more specifically to cleaning disks for cleaning transducers in flexible computer disk systems and packaging thereof.

2. Prior Art

In order to maintain the performance of flexible computer disk systems, it is necessary to clean the magnetic heads located within these systems. The magnetic heads are also referred to as transducers and will be referred to by either name throughout this specification. Since the transducers are difficult to access, various efforts have been made to devise disks which are commonly contained in flexible disk jackets to execute the required cleaning function.

Various prior art systems have been developed in an attempt to provide a convenient means of cleaning the transducer(s) on flexible disk systems. Typical prior art systems have utilized two flexible cleaning disks contained in jackets. One of the jackets contains an abrasive lapping material, and the other contains a cleaning cloth material. The first jacket is inserted into a flexible computer disk drive and run for a predetermined amount of time, generally no longer than 10 seconds. The time is specifically of short duration so the abrasive material will not cause damage to the magnetic heads. Damage usually occurs when the abrasive material in the disk loosens debris from the heads or the cleaning disk is run for too long a period of time. The second jacket is then inserted into the drive system and run so as to pick up the loosened debris. A disadvantage with this prior art is in the damage that may be caused by operating the cleaning disk for too long a period of time.

In IBM Technical Disclosure Bulletin, Volume 20, No. 8 January, 1978, there is described a standard flexible disk jacket having an abrasive disk therein instead of the normal magnetic disk. The abrasive disk is coated with either chromic oxide or aluminum oxide. The assembly is used to initially lap the magnetic heads of flexible disk drives and subsequently remove contaminant build up on the heads. A disadvantage with this type of disk is that it may leave particles of its own residue thus causing damage to the transducers.

In U.S. Pat. No. 4,180,840 to Allan there is described a cleaning disk that is only capable of cleaning one head of a two sided flexible disk drive at a time, a distinct disadvantage.

In U.S. Pat. Nos. 4,377,831; 4,374,404, and 4,498,114 all to Davis there is disclosed, a light colored fibrous non abrasive disk saturated with a cleaning solution which requires a specially designed jacket to accommodate the solution. Light colored disks of the type disclosed present a disadvantage because they are insufficiently opaque to activate the optical systems within the computer drive system, thus being incapable of loading the transducers onto the disk.

In U.S. Pat. No. 4,499,516 there is disclosed an opaque ring printed onto a disk to assure that the optical mechanism sensing the presence of the disk is activated and the transducers are loaded onto the disk.

In U.S. Pat. No. 4,065,798 to Sugisaki et al there is described a laminated disk which has a flexible nonmagnetic support (e.g. polyvinyl chloride) coated with a magnetic layer on one side and a fibrous cleaning material on the other side The cleaning disk is located within a cartridge which contains a lubricating layer facing the magnetic layer of the cleaning disk and includes a normal radial slit which allows the magnetic head to contact the fibrous cleaning material.

The latter two prior art cleaning disks have certain disadvantages. The use of a cleaning solution is messy and adds expense to the use of disks because they cannot be used without the solution In addition, there may be a hazard of flammability and/or toxicity associated with the solution. Commonly used cleaning solutions have been shown to extract components of vinyl jackets and to deposit said components via evaporation on the disk and/or the head. Such viscous mobile materials serve as an attractant for debris and can actually injure transducer performance. Furthermore, the cleaning solution may dissolve components of a printed black index track leading to a yellow discoloration of the disk. The use of the opaque ring adds expense to the manufacturing operation since it must be placed in a concentric orientation to the center hole.

Accordingly, it is an object of the present invention to provide a means of effectively cleaning both transducers of a two sided disk drive simultaneously without the use of cleaning solutions or of materials sufficiently abrasive to cause wear to the heads.

It is a further object of the invention to provide a completely white disk having sufficient opacity to activate the optical system located within the computer disk drive so as to facilitate the loading of the transducers onto the cleaning disk.

It is a further object of the invention to obviate the need for an opaque ring attached to or printed on the index track of the cleaning disk.

It is a further object of this invention to provide a transparent, clear jacket which permits visualization of removed and entrapped particles on the surface of the cleaning disk.

SUMMARY OF THE INVENTION

A head cleaning disk for cleaning the magnetic transducer heads in flexible computer disk drives. The head cleaning disk comprises a top layer of a blend of high melt point abrasive polyethylene terephthalate and low melt point polyester fibers, an inner composite layer of an opaque thermoplastic film, and a bottom layer of a blend of abrasive high melt point polyethylene terephthalate fibers and low melt point polyester fibers. The top, inner and bottom layers are bonded together by passing them between a pair of heated rolls which are under pressure. The heat from the rolls melts the low melt point fibers in the top and bottom fibrous layers and the outside reflective thermoplastic polymer of the inner layer thusly securing the layers together. The top and bottom fibrous layers provide sufficient abrasivity so when they contact the transducer heads they will remove debris from the transducer heads without the use of cleaning solutions. The abrasivity of the fibrous layers is controlled so the layers have insufficient abrasivity to damage the transducer heads. The opaque film within the disk permits activation of the optical system within the computer drive so as to permit the tranducer heads to be loaded onto a disk.

BRIEF DESCRIPTION OF THE DRAWINGS

The objects and advantages of the present invention will become more apparent when viewed in conjunction with the following drawings, in which.

DESCRIPTION OF THE PREFERRED EMBODIMENT

The present invention relates to cleaning media for cleaning recording mediums and more specifically to a flexible cleaning disk for cleaning transducer heads within a computer disk drive system.

Figure 1:
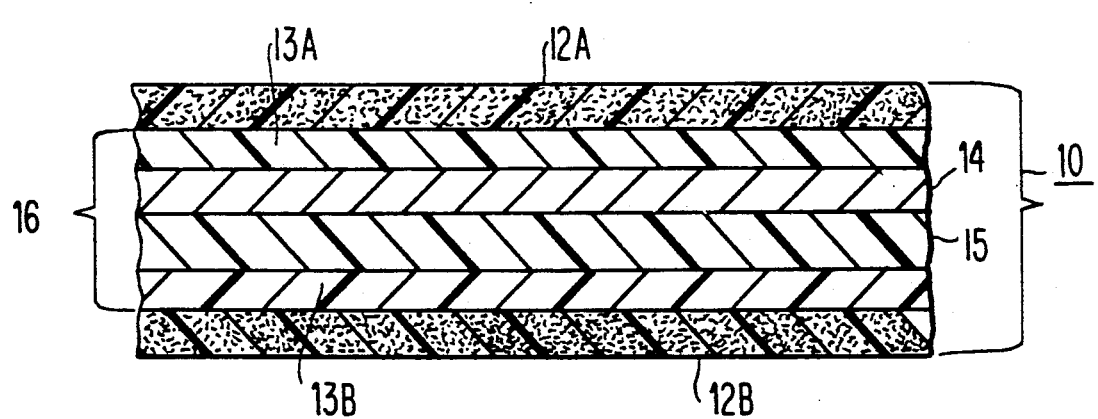
FIG. 1 is a cross sectional view of the present invention.
Figure 2:
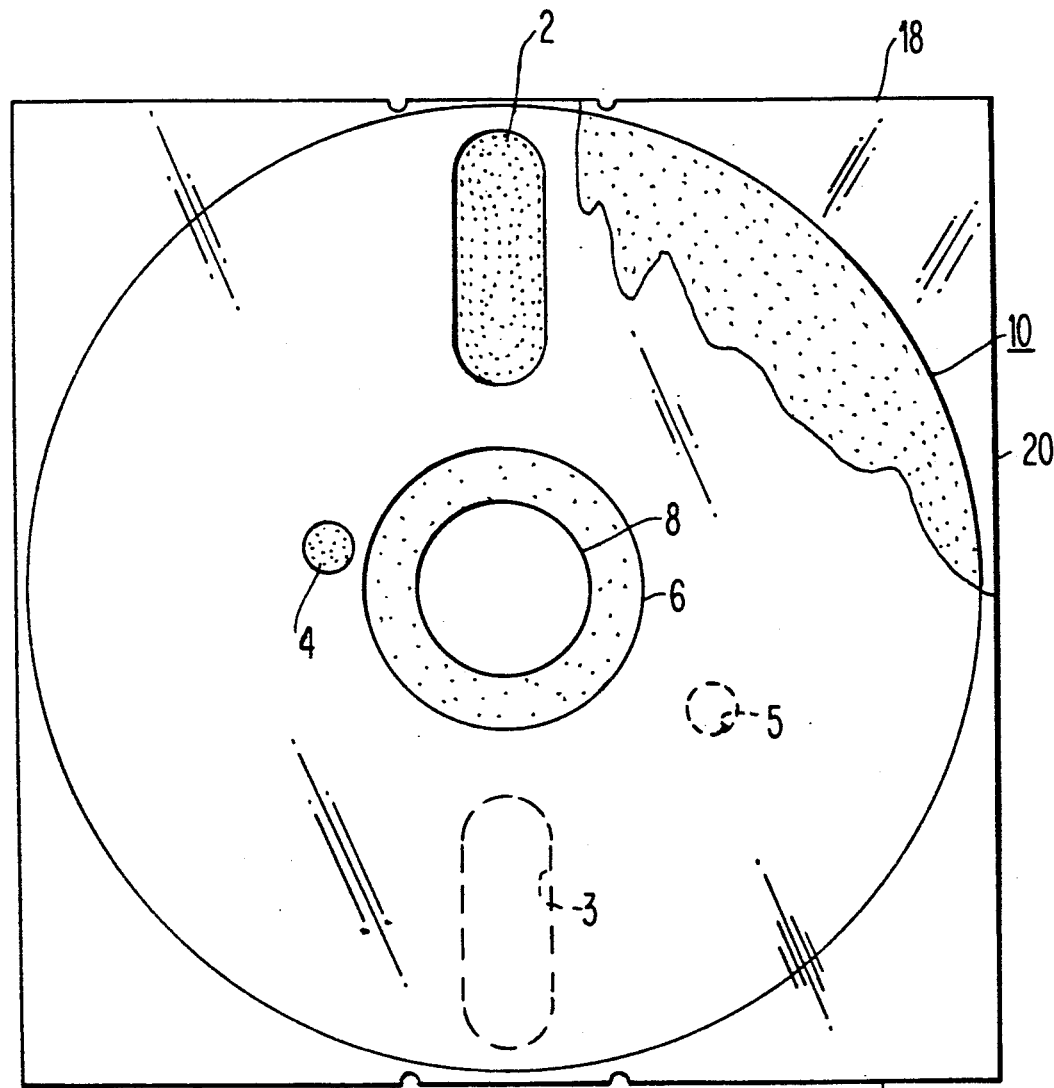
FIG. 2 is a top view of the present invention contained in a standard diskette jacket.

Referring to FIG. 2, there is shown a top view of the present invention transducer cleaning disk 10 contained within a jacket 20. In use, the disk 10 is supported by the jacket 20 in which it is contained. In FIG. 1, a cross-sectional view is shown of the composition of the cleaning disk 10. The present invention consists of an arrangement of top and bottom layers 12A and 12B which are a blend of high melt point abrasive fibers and low melt point fibers. The abrasive fibers are used to impart sufficient abrasivity to the disk to clean the heads, but not enough abrasivity to wear or damage the heads of a magnetic disk drive. The abrasive fibers may be composed of textile length polyethylene terephthalate (pet) fibers with a denier of between 5 and 45. The preferred denier is 15. A suitable textile length fiber is Eastman Type 431, 15 denier, 1.5 inches in length, made by Eastman Chemical Products, Inc. located in Kingsport, TN. The low melt point fiber is used to bond the abrasive wiping fibers to the inner multi-layer of film within the structure. The low melt point fiber may range in denier between 1.5 and 8. The preferred being a low melt fiber such as that made by Eastman, Type 410 polyester, 2.25 denier, 1.5 inches in length. The ratio of abrasive wiping fiber to low melt point fibers in the top and bottom layers is at least 4:1 by weight respectively. Although the preferred fibers of the top and bottom layers are as mentioned earlier, they may also consist of polyolefin, nylon, acrylic, or other suitable synthetic fibers or combinations thereof with slightly different results. The abrasive polyethylene terephthalate fibers are in the top and bottom layers so they will come into contact with the transducer heads thus cleaning the heads.

The disk 10 has an inner opaque layer 16, as shown in FIG. 1, which consists of a pair of outer layers 13A and 13B of white linear low density polyethylene containing a white reflective pigment such as titanium dioxide to impart whiteness to the structure, a metal layer 14, preferably aluminum, to impart opacity, and a polyester film layer 15 to impart stiffness. The titanium dioxide contained in the polyethylene in the outer layers 13A and 13B in conjunction with the reflective inner layers gives sufficient opacity to the cleaning disk to activate the optical system that is within the standard computer drive system while causing the disk to appear white. This multi-layer inner layer may be purchased from commercial sources such as Bryce Corporation, Memphis, TN. A typical thickness for the cleaning disk is about 0.0135 inches with the thicknesses of layers 12, 13, 14 and 15 being in the ratio 5000:700:480:1 respectively.

Because the present invention has this particular inner structure there is no need to print opaque rings to activate the optical system within the computer.

Additionally, although the preferred inner opaque layer is as mentioned above, the opaque layer may be a polyester film or polyester fibers opacified with carbon black or other opaque material.

As shown in FIG. 2, the flexible disk 10 has a central circular opening 8 by which a computer drive system may secure and rotate the disk when the transducer heads come into contact therewith. There is also a smaller opening 16 suitable for activating the photo detector within the drive of a computer. The photo detector or optical system activates the drive which moves the transducers into position and into contact with the cleaning disk. The jacket 20, as shown in FIG. 2, may be any suitable clear plastic film, although the preferred film is a rigid polyvinyl chloride (PVC). A jacket that is clear permits the visualization of removed and entrapped particles on the surface of the cleaning disk, a distinct advantage over the prior art. The jacket 20 has a central opening 6 and a pair of head access openings 2 and 3 as shown in FIG. 2. The head access opening 2 on the top of FIG. 2 appears on both top and bottom faces of the jacket and is suitable for drives employing double sided media. The head access opening 3 on the lower portion of FIG. 2 appears only in one face of the jacket and is utilized in drive employing only single sided media. Likewise, index opening 4 appearing in the jacket will index for two sided drive and opening 5 will index for one sided drives. Thus, edge 18 will be inserted first into two sided drives and edge 22 will be inserted into one sided drives. This means that the present invention provides an effective way to clean either a single transducer or dual transducer head without using a cleaning solution.

The disk 10 may be manufactured as follows: Two fibrous unbonded webs consisting of between 60%–80%, of 15 denier high melt point polyethylene terephthalate (PET) fibers of textile length, with 80% being the preferred, and between 20% and 40% of a low melt polyester, with the preferred being 20%, disposed on both sides of an opaque layer or multi-layer film. The film is made up of 2 outer layers of a low melt polymer such as polyethylene containing therein a white reflective pigment such as titanium dioxide to impart whiteness, and 2 inner layers, one of which is an opaque metal material such as aluminum and the other being a film such as polyethylene terephalate (PET) to impart stiffness to the composite film. The multi-layer composite film may be prebonded by the vendor who manufactures the film. The fibrous layers being disposed adjacent to each side of the aforementioned multi-layer film are then bonded to the film by passing the top and bottom fibrous layers and the inner opaque layer of multi-layer film between flat calendar rollers which are heated to about 295° F. The rolls are operating at a speed of approximately 30 feet per minute. The low melt point fibers in the top and bottom fibrous layers are melted by the heat from the rolls as are the (2) two layers of polyethylene of the inner multi-layer film. As these layers melt they become integral with each other and as they cool the layers secure themselves together to form the present invention cleaning disk.

Figure 3:
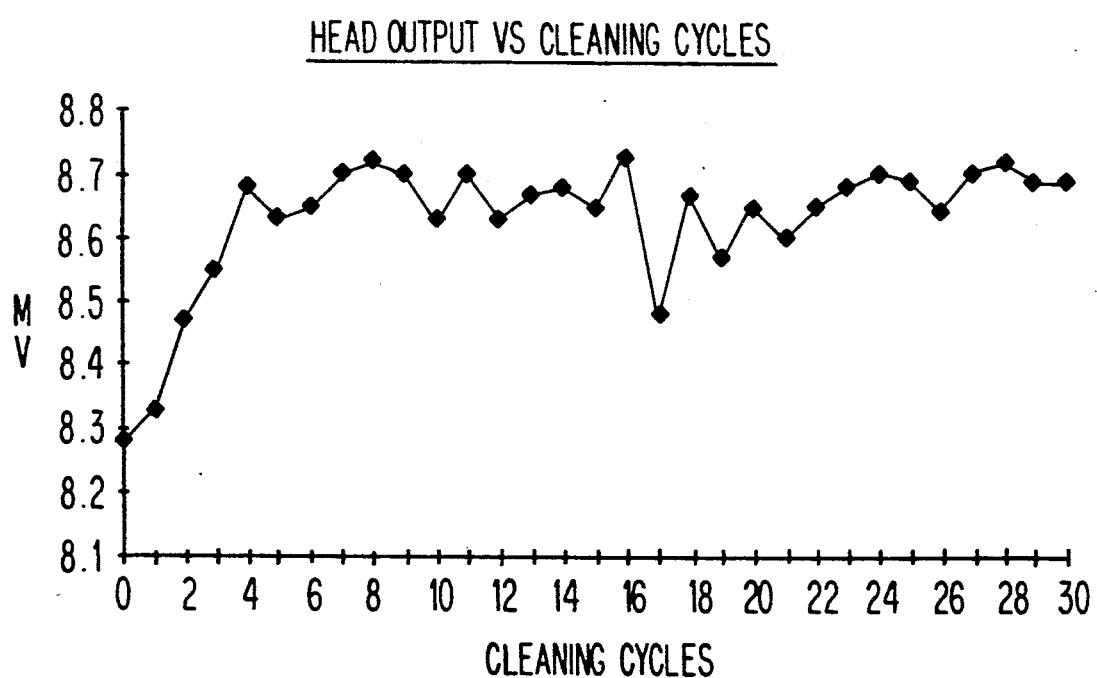
FIG. 3 is a graph that shows transducer head output versus its number of cycles.

FIG. 3 is a graph illustrates that transducer head output shown as MV (milli vent) increases as the head is cleaned by the present invention This clearly indicates that dirt is removed from the transducer head. In addition, the debris removed from the transducer heads was visible on the surface of the present invention because of the white background.

What is claimed is:

1. A magnetic head disk cleaning arrangement comprising:
   a transparent outer jacket;
   a disk disposed in said jacket having multiple layers, including both a top and a bottom layer each of high and low melt point fibrous webs;
   an inner opaque layer comprised of aluminum;
   an opaque polyester film layer sandwiched between a pair of reflective low density polyethylene layers, all of the inner opaque layers being thermocompressively sandwiched between said top and bottom fibrous web layers, for cleaning an arrangement of magnetic heads.

2. A magnetic head disk cleaning arrangement as recited in claim 1, wherein said jacket has a first edge with a pair of access openings there adjacent through said jacket to clean a pair of heads.

3. A magnetic head disk cleaning arrangement as recited in claim 2, wherein said jacket also has a second edge with a single access opening there adjacent through only one side of said jacket to clean a single head.

* * * * *